(12) United States Patent
Kelaher et al.

(10) Patent No.: US 7,516,520 B2
(45) Date of Patent: Apr. 14, 2009

(54) DUAL MEMBER HANDLE SYSTEM AND METHOD OF OPERATING THE SAME

(75) Inventors: Daniel P. Kelaher, Holly Springs, NC (US); Pat Gallarelli, Pittsboro, NC (US); Seth D. Lewis, Cary, NC (US); Timothy A. Meserth, Durham, NC (US); J. Scott Womble, Hillsborough, NC (US); Richard M. Barina, Sebring, FL (US)

(73) Assignee: International Business Machines Corporations, Armonk, NY (US)

( * ) Notice: Subject to any disclaimer, the term of this patent is extended or adjusted under 35 U.S.C. 154(b) by 329 days.

(21) Appl. No.: 11/334,290

(22) Filed: Jan. 17, 2006

(65) Prior Publication Data

US 2007/0163085 A1  Jul. 19, 2007

(51) Int. Cl.
*A45C 3/00* (2006.01)
(52) U.S. Cl. .............. 16/445; 16/418; 16/114.1
(58) Field of Classification Search ........... None
See application file for complete search history.

(56) References Cited

U.S. PATENT DOCUMENTS

| | | | | |
|---|---|---|---|---|
| 212,881 A * | 3/1879 | Bachtenkirch | ............... | 16/445 |
| 3,115,229 A * | 12/1963 | Erhard | ............... | 16/408 |
| 3,243,020 A * | 3/1966 | Friedlander | ............... | 16/114.1 |
| 3,269,495 A * | 8/1966 | Bush | ............... | 16/114.1 |
| 3,335,828 A * | 8/1967 | Simms | ............... | 16/406 |
| 3,804,290 A * | 4/1974 | Billman | ............... | 220/669 |
| 4,488,624 A * | 12/1984 | Myers | ............... | 190/120 |
| 4,775,072 A * | 10/1988 | Lundblade et al. | ............... | 220/766 |
| D317,081 S * | 5/1991 | King | ............... | D3/287 |
| 5,105,919 A * | 4/1992 | Bomes et al. | ............... | 190/18 A |
| D329,329 S * | 9/1992 | Bomes et al. | ............... | D3/279 |
| 5,413,199 A * | 5/1995 | Clement | ............... | 190/108 |
| 5,454,478 A * | 10/1995 | Everson | ............... | 220/23.83 |
| 5,699,886 A * | 12/1997 | Latshaw | ............... | 190/108 |
| 5,882,097 A * | 3/1999 | Kohagen et al. | ............... | 312/235.1 |
| 5,906,291 A * | 5/1999 | Mann et al. | ............... | 220/756 |
| D440,765 S * | 4/2001 | Spence et al. | ............... | D3/289 |
| 6,338,180 B1 * | 1/2002 | Massard | ............... | 16/114.1 |
| 6,421,882 B1 * | 7/2002 | Liao et al. | ............... | 16/445 |
| 6,742,635 B2 * | 6/2004 | Hirshberg | ............... | 190/2 |
| 2004/0231102 A1 * | 11/2004 | Morenstein et al. | ............... | 16/114.1 |

\* cited by examiner

*Primary Examiner*—Victor Batson
*Assistant Examiner*—Roberta Delisle
(74) *Attorney, Agent, or Firm*—Kunzler & McKenzie

(57) ABSTRACT

A dual member handle system and method of operating the same. The system includes a body, a first handle rotably attached to the body, and a second handle rotably attached to the body. The first handle is attached adjacent the second handle. The first handle rotates about a first axis and the second handle rotates about a second axis that is different from the first axis. The method includes rotating a first handle about a first axis and rotating a second handle, while rotating the first handle, about a second axis. The second axis is adjacent to and different from the first axis.

10 Claims, 4 Drawing Sheets

DUAL MEMBER HANDLE SYSTEM AND METHOD OF OPERATING THE SAME

TECHNICAL FIELD OF THE INVENTION

The present invention relates generally to handles and in particular to handle systems and methods of operating the same.

BACKGROUND OF THE INVENTION

Numerous handle designs for lifting objects, such as containers, are known in the art. One problem is a lack of a permanent yet strong lift handle design for applications with restricted handle thickness. In applications where there is very little space available for the thickness of the handle, thinner handles are all that can fit. This thin material puts high stresses on the surface of the hand while lifting the container. One way to avoid this problem is to provide removable handles, but they will often be missing when the item needs to be lifted. Removable handles also cause additional difficulties during installation and removal: the lifter must support the device with one hand while attempting to remove (or install) the lift handle with the other. Powered lift-assisted devices are often unavailable and usually too expensive for many lifting situations. As such, it would be desirable to provide a permanent yet strong lift handle operable in limited space situations.

Another problem that occurs with integrated lift handles is that they can trap fingers while the device is being lifted if the upward rotation of the handle is not limited. One way to limit rotation is to have a piece of the material of which the handle housing is made form a small block to prevent further rotation of the handle. However, this often causes deformation of the handle or the device itself. As such, it would be desirable to provide a lift handle that does not trap fingers or deform during rotation.

Therefore, it would be desirable to provide a handle system and method of operating the same that would overcome the aforementioned and other disadvantages.

SUMMARY OF THE INVENTION

One aspect of the present invention provides a dual member handle system. The system includes a body, a first handle rotably attached to the body, and a second handle rotably attached to the body. The first handle is attached adjacent the second handle. The first handle rotates about a first axis and the second handle rotates about a second axis that is different from the first axis.

Another aspect of the present invention provides a method of operating a dual member handle system. The method includes rotating a first handle about a first axis and rotating a second handle, while rotating the first handle, about a second axis. The second axis is adjacent to and different from the first axis.

Another aspect of the present invention provides a dual member handle system. The system includes means for rotating a first handle about a first axis and means for rotating a second handle, while rotating the first handle, about a second axis, which is adjacent to and different from the first axis.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
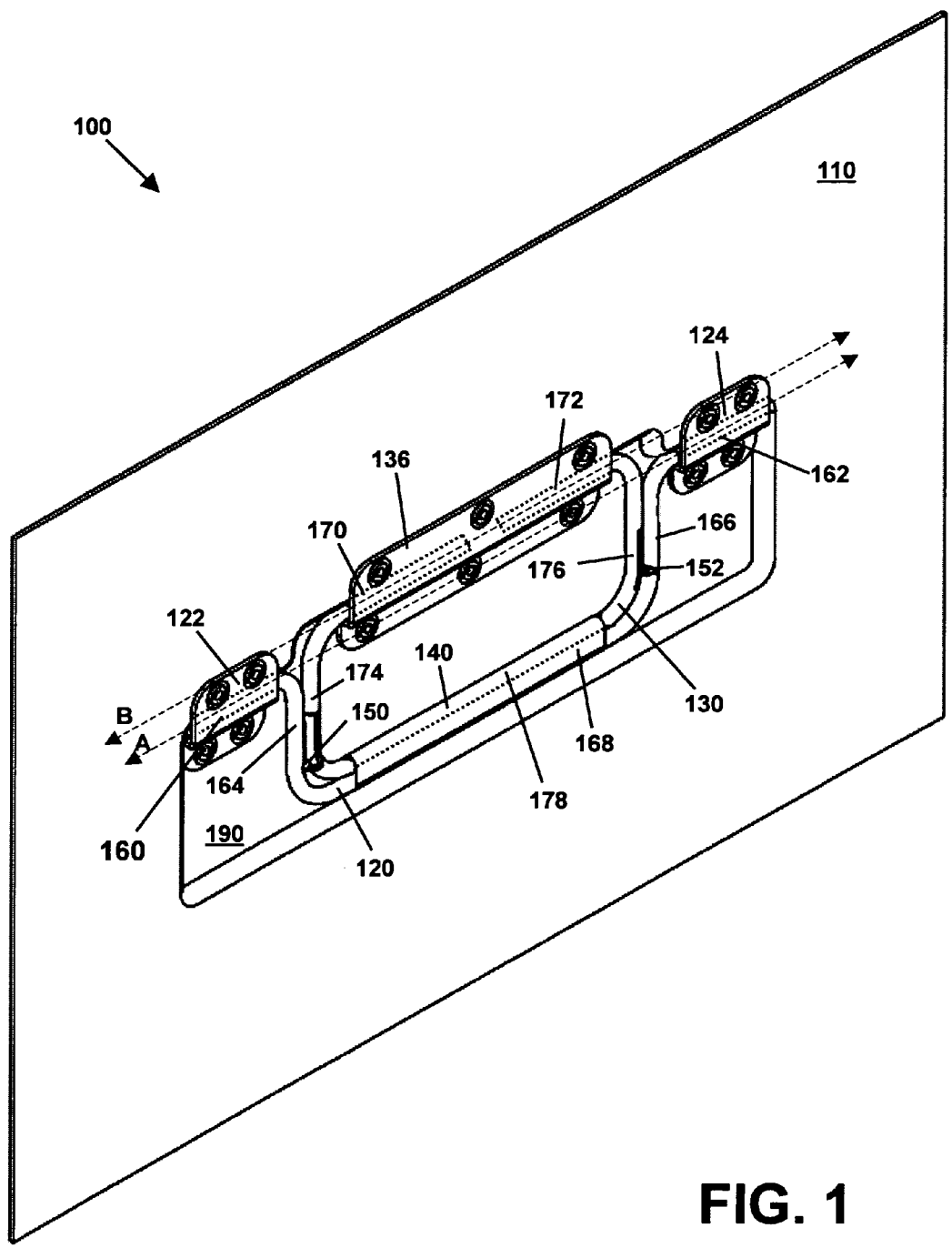
FIG. 1 is a perspective view of a dual member handle system shown in a stowed position, in accordance with one embodiment of the present invention.

FIG. 1 is a perspective view of a dual member handle system in accordance with one embodiment of the present invention, shown generally by numeral 100. System 100 includes a body 110, a first handle 120 rotably attached to the body 110, and a second handle 130 rotably attached to the body 110. First handle 120 is attached adjacent the second handle 130. The first handle 120 rotates about a first axis A and the second handle 130 rotates about a second axis B that is different from the first axis A. In one embodiment, the body 110 is a container. In another embodiment, the body 110 can be virtually any object that can be lifted manually, by a lift-assist device, or lifted in any other way.

In one embodiment, the first handle 120 includes two hinge pins 160, 162, two side bars 164, 166, and a cross bar 168 lying substantially in a single plane. Two hinge pins 160, 162 are each connected to respective side bars 164, 166 at substantially right angles with radiused bends. Side bars 164, 166 are connected at opposite ends of the cross bar 168 at substantially right angles with radiused bends. Second handle 130 includes two hinge pins 170, 172, two side bars 174, 176, and a cross bar 178 lying substantially in a single plane. Two hinge pins 170, 172 are each connected to respective side bars 174, 176 at substantially right angles with radiused bends. Side bars 174, 176 are connected at opposite ends of the cross bar 178 at substantially right angles with radiused bends. In the lifting position, the side bars 174, 176 of the second handle 130 engage the cross bar 168 of the first handle 120. In one embodiment, first handle 120 includes rotation control features 150, 152 to ensure the first handle 120 stays above the second handle 130 in the lifting position.

In one embodiment, first handle 120 is positioned substantially outside of the second handle 130. Substantially outside is defined herein as the first handle 120 being positioned on an outer edge side of two side bars 174, 176. In another embodiment, the first and/or second handles include a single hinge pin. For example, the two hinge pins 170, 172 may be formed as a single connected unit instead of two separate portions.

In one embodiment, first handle 120 is substantially wider than the second handle 130. Substantially wider is defined herein as the first handle 120 having a substantially longer cross bar 168 than the cross bar 178 of the second handle 130.

In one embodiment, the first handle 120 is operably attached to the body 110 with the two hinge pins 160, 162 at mounts 122, 124 pointing in an outward direction from the first handle 120. Second handle 130 is operably attached to the body 110 with the two hinge pins 170, 172 at mount 136 pointing in an inward direction from the second handle 130. In other embodiments, the positioning, attachment, and width of the first and second handles can vary and is not limited to the description and illustrations provided herein. For example, the hinge pins for the second handle 130 can point outward from the second handle 130, in the same direction illustrated in FIG. 1 for the two hinge pins 160, 162 of the first handle 120. In one embodiment, a sheath 140 is operably attached to rotate about the cross bars 168, 178 and maintains the cross bars 168, 178 parallel and in constant contact throughout the range of motion of the handle system. The wide surface area provided by the sheath 140 reduces the pressure exerted on hand during lifting. First and second handles 120, 130 and sheath 140 can be manufactured from a rigid material such as steel, rolled steel, or the like. In another embodiment, the first and/or second handle may be made of a number of pieces. For example, the cross bar 168 may be made of two separate parts which are inserted in the sheath 140 to form the first handle 120. The first and or/or second handle(s) may be removable from the body 110. Those skilled in the art will appreciate that many configurations are suitable for particular applications.

In one embodiment, a recess 190 formed within the body 110 receives the first and second handles 120, 130. The recess 190 provides a low side profile as the first and second handles 120, 130 fold into the body 110 in a stowed position, as shown in FIG. 1. The recess may vary is shape and depth based on the shape, size, and constitution of the first handle 120, second handle 130, and sheath 140. In one embodiment, the first and second handles 120, 130 may be thinner for a comparable load than if only a single handle were used. As such, the first and second handles 120, 130 require less clearance (i.e., provide a lower profile when stowed) than a thicker handle. Because of their low profile, the first and second handles 120, 130 can be permanently attached to prevent their loss. In another embodiment, the recess 190 can be omitted and the handle system 100 mounted on a face of the body 110.

Figure 2:
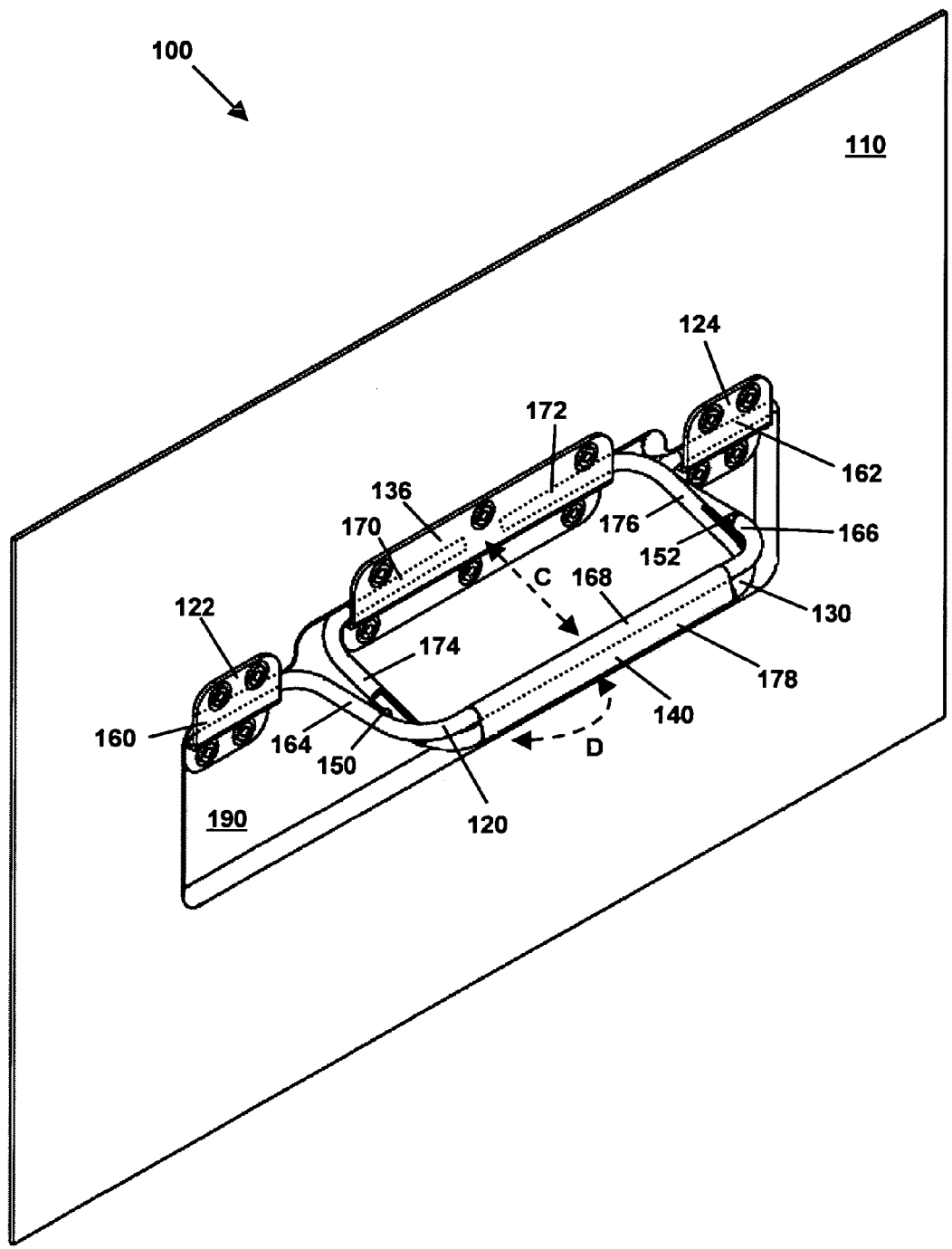
FIG. 2 is a perspective view of the dual member handle system of FIG. 1 shown in a lifting position, in accordance with one embodiment of the present invention.
Figure 3:
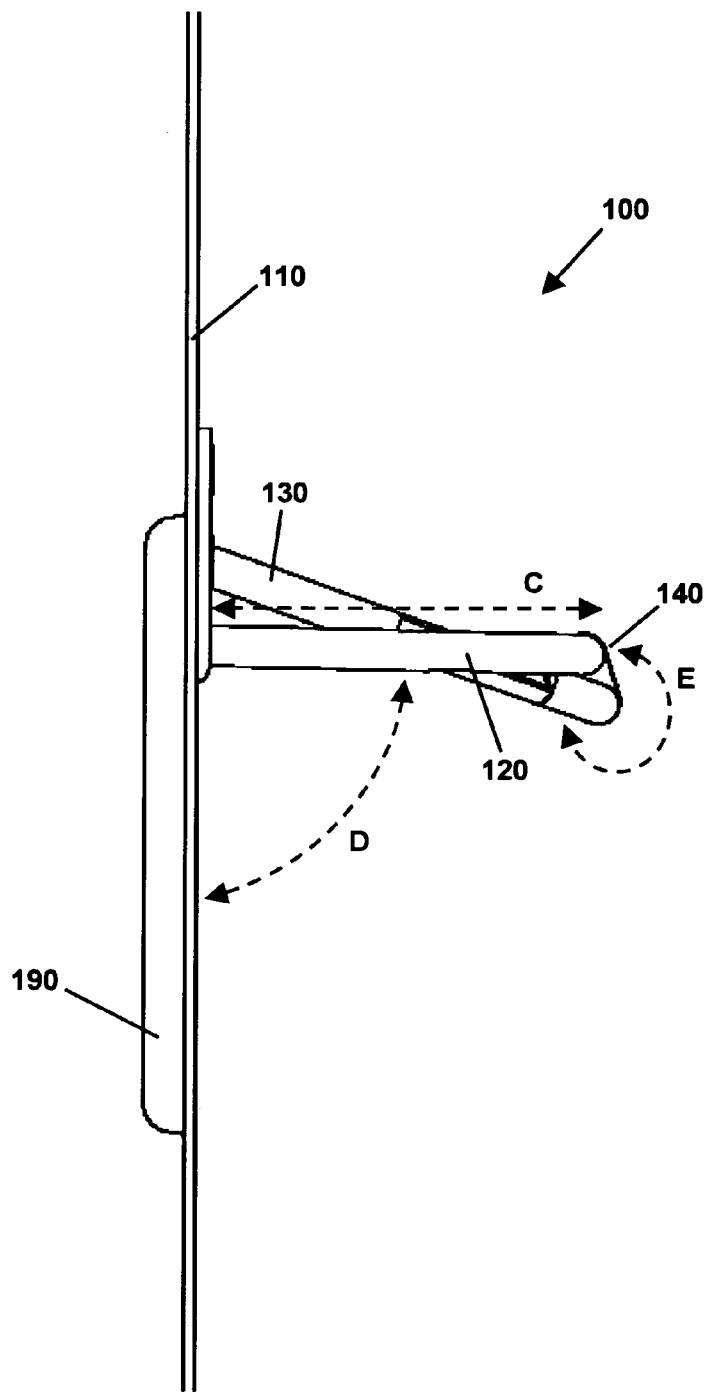
FIG. 3 is an end view of the dual member handle system of FIG. 1 shown in a lifting position, in accordance with one embodiment of the present invention.

During operation, the first and second handles 120, 130 rotate (i.e., swing along motion curve D as shown in FIGS. 2 & 3, and about respective axes A and B as shown in FIG. 1) into a lifting position. First and second handles 120, 130 rotate substantially parallel one to another and along different axes until the sheath 140 extends a predetermined distance C from the body 110. Rotation of the first handle 120 relative to the body 110 occurs at the two hinge pins 160, 162 and mounts 122, 124. Rotation of the second handle 130 relative to the body 110 occurs at the two hinge pins 170, 172 and mount 136. As the first and second handles 120, 130 rotate toward the lifting position, the cross bar 168 of the first handle 120 rotates about the cross bar 178 of the second handle 130 thereby allowing the first and second handles 120, 130 to engage one another adjacent the side bars 164, 166, 174, 176 as shown in FIG. 2. The sheath 140 rotates along a curved path E as shown in FIG. 3 as the first and second handles 120, 130 rotate from the stowed to the lifting position. The engagement of the cross bar 168 of the first handle 120 with the side bars 176 and 178 of the second handle 130 limits the upward motion of the sheath 140, preventing the sheath 140 from further motion toward the body 110. The engagement of the first handle 120 with the second handle 130 locks the first and second handles 120, 130 with respect to one another at the lifting position. The locking of the two handles with one another at the lifting position prevents over-rotation that could trap and pinch a hand during lifting.

Figure 4:
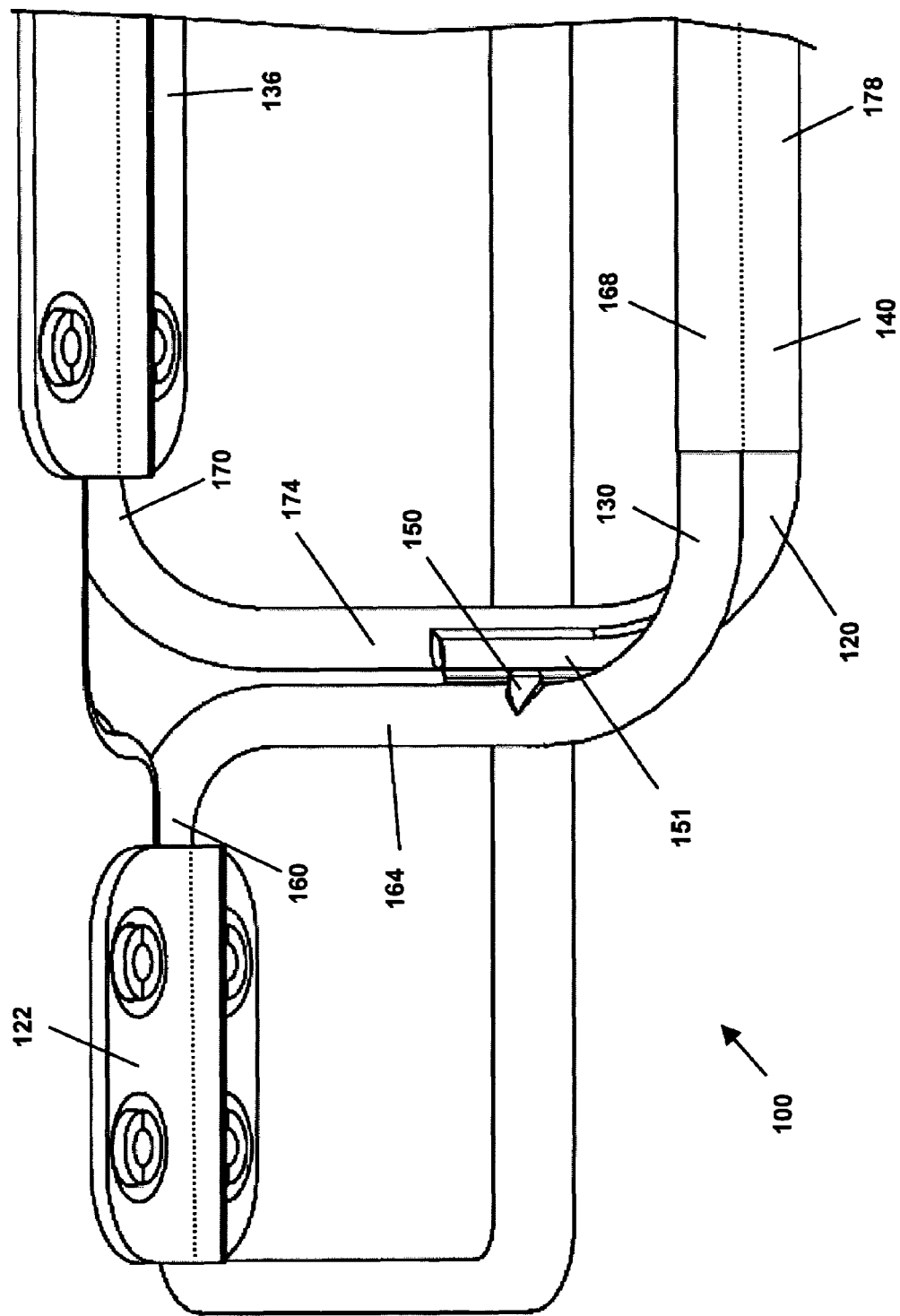
FIG. 4 is a perspective view of a rotation control feature, in accordance with one embodiment of the present invention.

In one embodiment, a rotation control feature 150 as shown in FIG. 4 is operably attached to the first handle 120 for also engaging the second handle 130 in groove 151 when in the lifting position. The groove 151 also provides a space in which the rotation control feature 150 travels as the first and second handles 120, 130 move between the stowed and lifting position. Rotation control feature 150 ensures that handle 120 rotates such that the cross bar 168 of handle 120 ends up above side bars 176 and 178 of handle 130 to lock the handle system into the lifting position. Rotation control feature 150 may be shaped to the rounded shape of the second handle 130 for attachment and fabrication. At the lifting position, the first and second handles 120, 130 are limited from further rotation by the engagement of the first and second handles 120, 130. The use of the first and second handles 120, 130 in the lifting position reduces bending of one of the handles compared to the bending which occurs when a single handle is used. Those skilled in the art will appreciate that the number and position of the rotation control features may vary as suited for a particular application. In one example, a single rotation control feature 150 is attached to the first handle 120. In another example, two rotation control features 150, 152 are attached to or formed out of the first handle 120, as shown in FIGS. 1 and 2. In yet another example, the rotation control features may be located on or formed out of the second handle 130, rather than the first handle 120.

It is important to note that the figures and description illustrate specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A dual member handle system comprising:
a body comprising a recess formed within the body;
a first handle rotably attached to the body and disposed within the recess in a stowed position, the first handle comprising a first first-handle side bar, a second first-handle side bar, and a first-handle cross bar connected between the first first-handle side bar and the second first-handle side bar;
a second handle rotably attached to the body and disposed within the recess coplanar with and interior to the first handle in the stowed position, the second handle comprising a first second-handle side bar, a second second-handle side bar, and a second-handle cross bar connected between the first second-handle side bar and the second second-handle side bar and oriented parallel to the first-handle cross bar, the first second-handle side and second second-handle side bar oriented perpendicular to the second-handle cross bar; and
a sheath operably attached to surround the first-handle cross bar and the second-handle cross bar and maintain the first-handle cross bar and the second-handle cross bar in parallel and constant contact;
wherein the first handle rotates about a first axis, and the second handle rotates about a second axis that is different from the first axis, the first-handle cross bar engaging the first second-handle side bar and the second second-handle side bar at a lifting position wherein the rotation of the second handle about the second axis away from the stowed position is arrested by first handle and the rotation of the first handle about the first axis away from the stowed position is arrested by the sheath.

2. The system of claim 1 wherein the body comprises a container.

3. The system of claim 1 wherein the first handle is positioned substantially outside of the second handle.

4. The system of claim 1 wherein the first handle is operably attached to the body with hinge pins pointing in an outward direction from the first handle.

5. The system of claim 1 wherein the second handle is operably attached to the body with hinge pins pointing in an inward direction from the second handle.

6. The system of claim 1 wherein the first handle is substantially wider than the second handle.

7. The system of claim 1 further comprising at least one rotation control feature operably attached to one of the first handle and the second handle to rotate the first-handle cross bar about the second-handle cross bar.

8. The system of claim 1 further comprising at least one rotation control feature operably attached to one of the first handle and the second handle to control rotation of the other of the first handle and the second handle about the one of the first handle and the second handle.

9. A container comprising:
a body, the body including at least one recess disposed along a side of the body;
a first handle attached to the body within the recess in a stowed position, the first handle comprising a first hinge pin, a second hinge pin, a first first-handle side bar, a second first-handle side bar and a first-handle cross bar connecting the first first-handle side bar and the second first-handle side bar, and wherein the first-handle cross bar is substantially parallel to the first hinge pin and second hinge pin, wherein the first handle rotates about a first axis defined by the first hinge pin and second hinge pin;
a second handle attached to the body within the recess coplanar with and interior to the first handle in the stowed position, the second handle comprising a first second-handle hinge pin, a second second-handle hinge pin, a first second-handle side bar, a second second-handle side bar and a second-handle cross bar connecting the first second-handle side bar and the second second-handle side bar and oriented parallel to the first-handle cross bar, the first second-handle side and second second-handle side bar oriented perpendicular to the second-handle cross bar, and wherein the second-handle cross bar is parallel to the first second-handle hinge pin and second second-handle hinge pin, wherein the second handle rotates about a second axis defined by the first second-handle hinge pin and second second-handle hinge pin, the second axis offset from the first axis, the second axis parallel with the first axis;
a sheath operably attached to surround the first-handle cross bar and the second-handle cross bar and maintain the first-handle cross bar and the second-handle cross bar in parallel and constant contact;
the first-handle cross bar engaging the first second-handle side bar and the second second-handle side bar at a lifting position wherein the rotation of the second handle about the second axis away from the stowed position is arrested by first handle, and the rotation of the first handle about the first axis away from the stowed position is arrested by the sheath;
at least a first rotation control feature attached to the first handle; and
at least a first groove within the second handle, wherein the first rotation control feature engages the first groove at the lifting position.

10. A container comprising:
a body, the body including at least one recess disposed along a side of the body;
a first handle attached to the body within the recess in a stowed position, the first handle comprising a first hinge pin, a second hinge pin, a first first-handle side bar, a second first-handle side bar and a first-handle cross bar connecting the first first-handle side bar and the second first-handle side bar, and wherein the first-handle cross bar is substantially parallel to the first hinge pin and second hinge pin, wherein the first handle rotates about a first axis defined by the first hinge pin and second hinge pin;
a second handle attached to the body within the recess coplanar with and interior to the first handle in the stowed position, the second handle comprising a first second-handle hinge pin, a second second-handle hinge pin, a first second-handle side bar, a second second-handle side bar and a second-handle cross bar connecting the first second-handle side bar and the second second-handle side bar and oriented parallel to the first-handle cross bar, the first second-handle side and second second-handle side bar oriented perpendicular to the second-handle cross bar, and wherein the second-handle cross bar is parallel to the first second-handle hinge pin and second second-handle hinge pin, wherein the second handle rotates about a second axis defined by the first second-handle hinge pin and second second-handle hinge pin, the second axis offset from the first axis, the second axis parallel with the first axis;
a sheath operably attached to surround the first-handle cross bar and the second-handle cross bar and maintain the first-handle cross bar and the second-handle cross bar in parallel and constant contact;
the first-handle cross bar engaging the first second-handle side bar and the second second-handle side bar at a lifting position wherein the rotation of the second handle about the second axis away from the stowed position is arrested by first handle, and the rotation of the first handle about the first axis away from the stowed position is arrested by the sheath;
at least a first rotation control feature attached to the second handle; and
at least a first groove within the first handle, wherein the first rotation control feature engages the first groove at the lifting position.

* * * * *